(12) United States Patent
Conochie et al.

(10) Patent No.: US 6,249,989 B1
(45) Date of Patent: Jun. 26, 2001

(54) METHOD AND APPARATUS FOR HEAT TRANSFER

(75) Inventors: David S. Conochie, Camberwell; Mark J. Greenwood, Brunswick, both of (AU)

(73) Assignee: KFx Inc., Denver, CO (US)

( * ) Notice: Subject to any disclaimer, the term of this patent is extended or adjusted under 35 U.S.C. 154(b) by 0 days.

(21) Appl. No.: 09/380,787
(22) PCT Filed: Mar. 5, 1998
(86) PCT No.: PCT/AU98/00142
  § 371 Date: Nov. 29, 1999
  § 102(e) Date: Nov. 29, 1999
(87) PCT Pub. No.: WO98/39613
  PCT Pub. Date: Sep. 11, 1998

(30) Foreign Application Priority Data

Mar. 5, 1997 (AU) .................................................. PO 5464

(51) Int. Cl.[7] ........................................................ F26B 3/00
(52) U.S. Cl. ............................... 34/337; 34/348; 34/357; 34/363; 34/586; 34/588; 34/181; 34/187
(58) Field of Search ............................. 34/329, 330, 337, 34/343, 348, 351, 357, 368, 378, 487, 576, 586, 588, 589, 181, 182, 187, 201, 205; 110/346, 347; 165/104.16, 104.18

(56) References Cited

U.S. PATENT DOCUMENTS

| | | |
|---|---|---|
| 3,558,111 * | 1/1971 | Avery ....................................... 34/362 |
| 3,565,408 | 2/1971 | Reh et al. . |
| 3,765,102 * | 10/1973 | Fischer ..................................... 34/136 |
| 3,884,649 | 5/1975 | Matthews . |
| 4,307,773 * | 12/1981 | Smith ............................... 165/104.16 |
| 4,354,903 | 10/1982 | Weber et al. . |
| 4,506,453 * | 3/1985 | Shirley, Jr. et al. .................... 34/362 |
| 4,601,113 | 7/1986 | Draper et al. . |
| 4,734,165 | 3/1988 | Bauer et al. . |
| 4,822,761 | 4/1989 | Walters et al. . |
| 4,852,996 | 8/1989 | Knop et al. . |
| 5,120,691 | 6/1992 | Pontier et al. . |
| 5,290,523 | 3/1994 | Koppelman . |
| 5,353,517 | 10/1994 | Weiss . |
| 5,409,872 | 4/1995 | Raterman . |
| 5,526,582 * | 6/1996 | Isaksson ................................. 34/476 |
| 5,659,974 * | 8/1997 | Graeff ..................................... 34/378 |

FOREIGN PATENT DOCUMENTS

72645/87  5/1986  (AU) .

* cited by examiner

*Primary Examiner*—Stephen Gravini
(74) *Attorney, Agent, or Firm*—Harness, Dickey & Pierce, P.L.C.

(57) ABSTRACT

A method and apparatus of heating or cooling a charge of a solid material are disclosed. The method includes the steps of supplying a charge of the material to form a packed bed of solids in a process vessel having one or more passageways through which a heat transfer fluid can flow, passing a heat transfer fluid through the one or more passageways and supplying a working fluid to said vessel. The method is characterized by circulating the working fluid through the bed, the circulation step including removing at least part of the working fluid from one or more sections of the vessel and then returning the working fluid to other sections of the vessel.

16 Claims, 7 Drawing Sheets

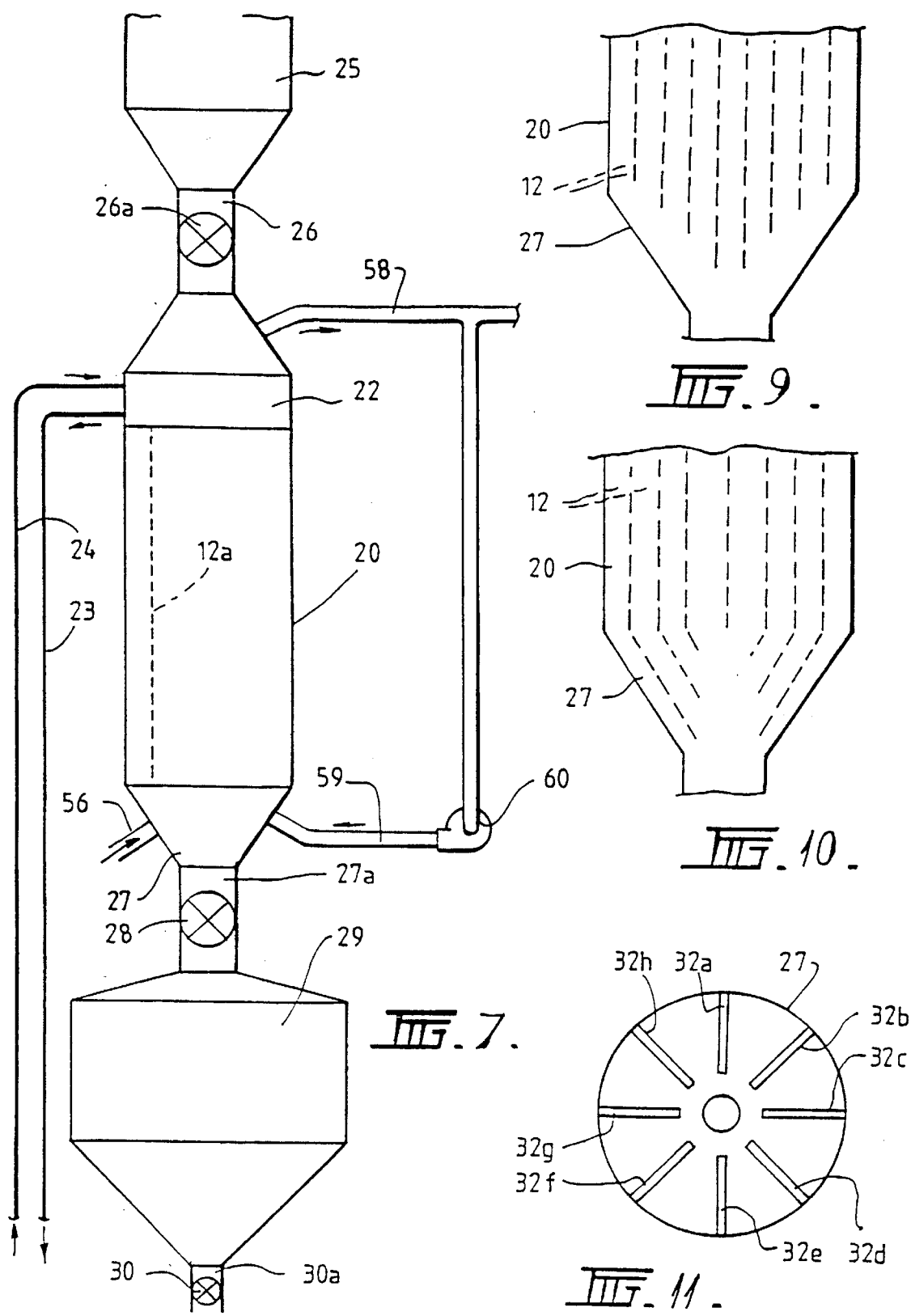

METHOD AND APPARATUS FOR HEAT TRANSFER

The present invention relates to a method and an apparatus for transferring heat to or from a charge of material containing solids.

The present invention relates particularly to a method and an apparatus for transferring heat to or from a low thermal conductivity charge of material containing solids.

A number of industrial methods require that a charge of material containing solids be heated or cooled in order to initiate and sustain a chemical reaction or physical changes. Typically, it is necessary to heat the charge to an elevated temperature for the chemical reaction or physical change to occur. Unfortunately, many charges of solid materials have very low thermal conductivities and it is difficult to heat such charges using indirect heat transfer. Such charges are frequently heated by direct heat transfer, for example, by supplying hot gases to packed beds or fluid beds of the charges.

As used throughout this specification, "direct heat transfer" refers to heat transfer in which a heat transfer fluid comes into direct contact with the material to be heated or cooled. "Indirect heat transfer" refers to heat transfer in which the heat transfer fluid is separated from the material being heated or cooled by a physical barrier, such as the wall of a tube.

Some methods are not amenable or suitable for direct heat transfer. The ratio of heat capacitance between solids and gases is such that large volumes of gas or fluid are required to transfer the heat. For example, flow of the large volumes of gas required for heat transfer-through a packed bed is not possible unless the bed is very coarse or heating and cooling times are very long. In the case of methods involving coal and other materials which contain substances which may be volatile at elevated temperatures, direct heat transfer may result in volatile material being driven off with the heating gas which could cause difficulties in cleaning the offgas prior to emission of the offgas through the flue or stack. In other methods, direct heat transfer may lead to solids handling difficulties or maintenance problems caused by solids carry over in gas streams. In such methods, it is necessary to utilise indirect heat transfer to heat the charge.

One known indirect heat transfer method is the upgrading of coal, particularly low rank coal, by the simultaneous application of temperature and pressure described in U.S. Pat. No. 5,290,523 to Koppelman. In this method, heating a charge of coal under elevated pressure results in water being removed from the coal by a squeeze reaction caused by structural realignment of the coal and also by decarboxylation reactions. Furthermore, some soluble ash-forming components are also removed from the coal. This results in upgrading of coal by thermal dewatering and upgrading of the calorific value of the coal. By maintaining the pressure sufficiently high during the upgrading process, vaporization of the removed water can be substantially avoided which reduces the energy requirement of the method. Furthermore, the by-product water is produced mainly as a liquid rather than as steam or vapour.

The thermal processing of coal requires heat transfer to the coal (typically 300–600 Btu/lb), but the effective thermal conductivity of a packed bed of coal is approximately 0.1 W/mK, making the coal bed a good thermal insulator.

Options that might be considered to accelerate heating of coal to provide a process which achieves a reasonable heat-up time of a coal bed include:

Increase of thermal driving force by increasing the temperature of the heat transfer medium. This tends to lead to devolatilisation of coal which for low rank coal upgrading reduces the heating value of the product. Moreover, this also leads to condensation of tars and other volatilised materials in other parts of the vessel system.

Use of fluid beds. This leads to the need to circulate large volumes of (inert) gas which again accentuates the problem of devolatilisation of the coal. It also requires gas cooling and cleaning before recompression or the operation of a hot dirty compressor, both of which involve capital and maintenance. Further, fluid beds tend to separate fines.

Use of agitated beds such as a rotary kiln. The operation of such reactors at elevated pressures, with inert atmosphere, involves massive engineering difficulty and expense. Indirect heat transfer is preferred, but this further complicates the engineering difficulties and the volume occupancy of coal in the vessel can be low.

Use of flash drying of a ground feed. This requires subsequent agglomeration to produce a marketable product. It also requires an inert gas for heat transfer and the reactive volumes tend to be large because of the dispersed state of the solids.

Hydrothermal dewatering of coal in which the coal is ground to a small particle size and mixed with water to form a slurry and the slurry is subsequently heated to an elevated temperature at elevated pressure to maintain liquid conditions. This process requires grinding of coal which must then be either agglomerated or used directly in a process, such as at a power station. Furthermore, the mass of water heated to elevated temperature is large and this requires large heat exchangers for heat recovery.

With the simultaneous application of high pressure (greater than 10 barg), each of the above options become more difficult.

A packed bed combined with indirect heat transfer is preferred for heating or cooling coal because of the minimisation of volatile loss, the lower energy consumption, and the production of the majority of the by-product water as liquid.

A packed bed also allows a wider range of coal sizes, and coarser coal sizes than would be preferred for a fluid bed operation. A packed bed also gives the smallest volume to contain in a high pressure vessel, provided the heating rates are high. A small vessel volume leads to savings in pressurisation time and vessel cost.

The classical approach for enhancing indirect heat transfer is to provide sufficient surface area between the heating medium and the charge to be heated. This leads to shell and tube arrangements, with heating medium either on the inside or the outside of the bundles of tubes. Such tube bundles may be appropriate to transfer heat to liquids and gases (although they are prone to scaling and buildup, requiring maintenance) but they have some limitations when used in the heating of solids. This is particularly so in the case where the solids comprise coal that may have a particle size of up to 19 mm (0.75 inch), or even export size coal having particle sizes of up to 50 mm (2 inches), where problems of bridging and sticking are encountered. Any heat transfer system for such materials must be designed to allow free flow of solids, either at the start and end of a cycle in a batch process, or during a continuous process.

A further difficulty with the above-described prior art shell and tube arrangements arises from the fact that most prior art process vessels require a discharge cone to be positioned at the lower end of the tube bundle in the vessel in order to discharge the coal from the vessel. It is almost impossible to have the tube bundle extend into the discharge cone and accordingly the appreciable volume of coal that is contained in the discharge cone is not heated by the tube bundle. To overcome this difficulty, some methods incorporate water injection or steam injection into the coal bed. These are known as working fluids. Such working fluids may be vaporised (if liquid) and superheated in the upper sections of the bed and then flow to the outlet at the bottom of the discharge cone. Cold solids in the discharge cone are thereby heated by the working fluid (by convection and possibly by condensation of the working fluid). However, injection of a working fluid has serious consequences for the energy utilisation of the process.

One prior art method utilises a shell and tube type heat transfer apparatus in which coal is fed to the tube side and a heat transfer oil flows through the shell side. The tubes have a diameter of typically 75 mm (3 inches) which means that the maximum distance for heat transfer is about 38 mm (1½ inches) ie. the distance from the wall of the tube to the centre of the tube. Although small diameter tubes have advantages when operating at high pressures, such process vessels are not ideal because it can be difficult to get solids to flow through the tubes. Moreover, short circuiting and channelling of the heat transfer oil on the shell side may occur (which leads to incomplete processing of the coal) and the vessel design is complex and difficult to engineer. In particular, the end plates for the tube bundle are difficult to engineer and are very thick and expensive components. The volume occupancy of coal in such reactors is typically only 30–50% of the total volume of the vessel.

The present inventors have discovered that particularly advantageous results can be achieved in heating or cooling a low thermal conductivity charge of material in a process vessel by utilising a working fluid that is forced to circulate through the process vessel.

In accordance with the present invention there is provided a method of heating or cooling a charge of a solid material, which method includes the steps of: supplying the charge of the material to form a packed bed of solids in a process vessel having one or more passageways through which a heat transfer fluid can flow; passing a heat transfer fluid through the one or more passageways; supplying a working fluid to the vessel; and circulating the working fluid through the bed, the circulation step including removing at least part of the working fluid from one or more sections of the vessel and then returning the working fluid to other sections of the vessel, whereby indirect heat transfer occurs between the heat transfer fluid and the charge and between the heat transfer fluid and the working fluid, and whereby direct heat transfer occurs between said working fluid and the charge as the working fluid circulates through the bed.

It is preferred that the charge have a low thermal conductivity.

The circulation of the working fluid has economic advantages in that a smaller inventory of the working fluid is needed.

In addition, the use of the circulating working fluid has substantial advantages in reducing energy consumption. This energy consumption reduction makes it possible to raise working fluid mass flow rates to the maximum level desired for optimum heat transfer and within the limits of pressure drop and particulate entrainment.

The working fluid may be circulated through the process vessel by using a fan or any suitable means to create an applied pressure differential.

Causing the working fluid to flow through the bed increases the effective thermal conductivity of the charge. The effective thermal conductivity varies as a function of particle size of the charge and as a function of the mass flowrate of the working fluid through the bed. In particular, increasing the mass flowrate of the working fluid through the bed results in an increase in the effective thermal conductivity of the charge.

Increasing the mass flowrate of the working fluid through the bed may be achieved by increasing the velocity of the working fluid, but this has limitations in that entrainment of the charge in the working fluid should preferably be minimised.

In cases where the working fluid is or contains a gas, increases in the mass flowrate may also be obtained by increasing the pressure within the system or by using a higher density gas. Higher densities may be achieved by gas selection, such as by using a mixture of gases or a gas/gases containing a fine mist, droplets or fine particles entrained in the working gas.

Preferably the method includes controlling the mass flow rate of the working fluid by controlling one or more of the velocity of the working fluid, the pressure in the vessel, and the density of the working fluid.

Preferably, the one or more passageways are positioned internally within the vessel.

More preferably, the heat transfer fluid flows through passageways in a plurality of plates arranged in the vessel. Heat transfer then takes place between the outer surfaces of the plates and the charge and the working fluid. The transfer of heat to or from the charge is enhanced by the working fluid flowing through the internal volume of the vessel and variously being in contact with the charge and the outer surfaces of the plates.

Throughout this specification, the term "plate" is used to encompass any three-dimensional shape that has an extent in one dimension that is substantially shorter than the extent of the other two dimensions. For example, a plate may include a planar plate or an annular or cylindrical plate.

Throughout this specification, the term "packed bed" is understood to mean that the particles in the bed are in contact with each other.

It is noted that the term "packed bed" does not exclude movement of the particles through a vessel which contains the packed bed—provided the particles remain in contact.

It is also noted that the term "packed bed" does not exclude localized movement of particles within a generally static bed.

In the case of coal, typically the term "packed bed" means that the bulk density of the bed is 600–800 kg/m$^3$.

In situations where the method is used to heat a charge of material, one distinction between the method and a number of prior art methods is that it is not essential to the subject method, although it is not precluded, that the working fluid be heated before it is supplied to the vessel.

In this connection, in the method of the present invention the working fluid enhances indirect heat transfer between the heat transfer fluid and the charge, and the amount of heat transferred by this mechanism may be many times the sensible heat in the working fluid. By way of example, the working fluid may leave the packed bed at a similar temperature to that at which it enters, yet still have been the path for the transfer of a considerable amount of heat from the heat transfer fluid to the charge. The enhancement of the indirect heat transfer that can be achieved by the use of the working fluid makes it possible to extend the length of the bed at the same mass flow rate of working fluid without significant change in heat transfer performance apart from an increase in pressure drop across the bed. This is a quite different outcome to that in a method based on direct heat transfer where the mass flow rate must be increased linearly with the bed length if performance is to be maintained. In a packed bed increases in mass flow rate raise major issues with scale up, where substantially increased pressure drop and fluidisation become limiting factors.

There is a further distinction between convective heat transfer with the working fluid and prior art convective heat transfer with externally heated gas. In the latter case, there is negligible temperature gradient across the bed and there is a temperature gradient down the bed—there may also be a temperature front move down the bed. In the case of indirect heat transfer that is possible with the working fluid, there is negligible temperature gradient down the bed apart from any entry effects. The temperature gradients are across the bed. Time to final average temperature is determined by heat transfer across the bed from the heat transfer surfaces to the centerline between the heat transfer surfaces. This allows a scale up by replication in the lateral dimension and extension in the vertical direction.

The working fluid is preferably a gas.

The gas may include, by way of example, a mixture of gases or a dispersion of fine liquid drops or fine solids.

Preferably, the working gas will not undergo a phase change in the conditions experienced in the method, although in some instances there may be benefit in using a working gas that contains a condensable component.

Preferably the superficial velocity of the working gas in the vessel is less than that at which the charge of material in the packed bed is fluidised.

Gases that may be used as the working gases include oxygen, nitrogen, steam, $SO_2$, $CO_2$, hydrocarbons, noble gases, refrigerants (such as freon) and mixtures thereof. Other gases may also be used. Components that are normally liquids at ambient temperature may also be used if they are in the gas phase at the operating temperatures encountered in the process vessel.

The working fluid may be inert in that it does not react with the charge or with the internals of the process vessel. However, in some cases the working fluid may comprise or include a component that reacts with the charge.

The method may be conducted in a process vessel that does not include plates as described above. For example, method may be carried out in a process vessel that includes one or more conduits located in the internal volume of the process vessel. The conduits may be aligned in rows to enable easier charging and discharging of the charge of material to and from the process vessel. The circulating working fluid may be heated or cooled, as the case requires, by external heating means or cooling means, respectively. One particular process vessel in this category is a Koppelman C-series shell/tube process vessel with coal in the tubes.

The method may be operated at any suitable pressure, including sub-atmospheric, atmospheric and above-atmospheric pressure. It is preferred particularly that the method be operated at elevated pressure to enable the mass flow rate of the working fluid to be maximised within constraints of minimising fluidisation or particle entrainment.

Preferably the solid material is coarse.

The term "coarse" is understood to mean a particle size greater than 5 mm.

According to the present invention there is also provided an apparatus for heating or cooling a charge of a solid material, which apparatus includes:

(i) a process vessel having an outer shell that defines an internal volume for containing the charge of the material as a packed bed of solids and an indirect heat transfer means located in the internal volume for heating or cooling the charge;

(ii) a means for supplying a working fluid to the vessel; and (iii) a means for circulating a working fluid through the bed.

It is preferred that the charge have a low thermal conductivity.

It is preferred that the means for circulating the working fluid includes an inlet for removing the working fluid from the vessel, an outlet for returning the working fluid to the vessel, and a pump or other suitable means for causing circulation of the working fluid through the vessel to the inlet and from the inlet to the outlet.

The inlet and the outlet may be in any suitable locations. By way of example, the inlet may be in an upper section of the vessel and the outlet may be in a lower section of the vessel.

It is preferred that the indirect heat transfer means includes a plurality of plates of a thermally conductive material positioned within the internal volume, and each plate includes one or more passageways through which a heat transfer fluid can flow.

Preferably, each plate in use defines one or more thermally conductive bypass between the heat transfer fluid and the solids in the region of the plate such that in use substantially all of the solids in the charge are heated or cooled to a desired temperature range by heat transfer between the heat transfer fluid and the solids via the plates.

The concept of "thermally conductive bypass" is discussed in detail in International application PCT/AU98/00005 and the disclosure in the International application is incorporated herein by cross-reference.

Preferably, the vessel includes an inlet means for introducing the charge into the vessel and an outlet means for removing the charge from the vessel.

Preferably, the plates are positioned relative to each other such that in use the solid material can flow between adjacent plates during loading and unloading of the vessel.

Preferably, the adjacent plates are spaced from 50–500 mm (2–20 inches) apart, more preferably from 75 to 200 mm (3–8 inches) apart, and more preferably from 75 to 125 mm (3–5 inches) apart.

The vessel is especially suitable for use in methods that are operated at high pressure, for example at pressures of 2 barg (29.4 psi) or more and preferably at pressures of 4 barg or more.

It is preferred that the thermal conductivity of the plates be at least an order of magnitude higher than the thermal conductivity of the charge in the vessel during operation.

In many methods in which the solid material is processed at elevated pressures, the solid material must be maintained under a pressure that is much higher than the pressure required to pump the heat transfer fluid through the passageways. For example, in the dewatering of coal, the heat transfer fluid (which is normally a heat transfer oil) is circulated at approximately 150 psi (1033 kPa) whereas the coal is held under a pressure of 800 psi (5510 kPa). Therefore, it is preferred that the plates in the vessel include one or a small number of passageways through which the heat transfer fluid can flow. More preferably, the passageways have a relatively small diameter or width and the thickness of the walls of the passageways is quite large. Expressed in slightly different terms, it is preferred that the volume of the passageways be a small percentage of the total volume of the plates. This assists in ensuring that the walls of the passageways are sufficiently strong to resist the pressure differential caused by the difference in pressure between the pressure applied to the outside of the plates and the inside of the passageways. Compared to heat jackets, the plates are strong and able to resist collapse or crushing at elevated pressure.

Apart from the passageways, it is preferred that the plates be solid.

The plates may be made from any suitable high thermal conductivity material.

It is preferred that the material of construction for the plates be substantially chemically inert to the heat transfer fluid flowing through the passageways, the solid material being processed in the vessel, which solid material is in contact with the outside of the plates, and any gases or liquids in the vessel. It will also be appreciated that such plates and any supporting means and piping means associated with the plates will need to have resistance to erosion and abrasion from coal entry, flow and discharge.

The shape of the plates may vary widely, although plates that have a rectangular, parallelogram or tapering cross section are preferred.

It is also preferred that the outer surfaces of the plates include substantially planar surfaces, although other shapes may also be used. The plates may also be cylindrical plates or annular plates positioned concentrically within the vessel.

The spacing between adjacent plates effectively defines a flow passage for the solid material. Therefore, the spacing between adjacent plates should be sufficiently large to ensure that undue blocking or bridging between plates by the solid material does not occur. Moreover, the spacing between the plates must be sufficiently small to ensure that adequate rates of heat transfer to all of the solid material between the plates is achieved. For solid materials such as coal, which have a very low thermal conductivity, a practical maximum for spacing between adjacent plates is 200 mm (8 inches), with 100 mm (4 inches) spacing being more preferred as shorter batch times or residence times can be used.

In a preferred embodiment, the vessel includes a substantially cylindrical portion with the plates arranged such that when viewed in cross-section the plates substantially extend across chords of the circular cross-section of the cylindrical portion. It is preferred that the plates extend substantially along the length of the cylindrical portion of the vessel.

It is also common practice to orient such vessels such that the longitudinal axis of the cylindrical portion is substantially vertical.

Such vessels are also commonly provided with a discharge cone that may comprise up to 20% of the volume of the vessel.

It is also preferred that the vessel further includes one or more plates positioned within the discharge cone portion of the vessel, said plates including one or more passageways for flow of a heat transfer fluid therethrough. The plates in the discharge cone are preferably shaped to avoid blockages in the solid flow. The plates may be shaped or truncated to facilitate the solids flow whilst still providing adequate heating or cooling of the solid material in the cone. Many geometries are possible, including radial plates, flow line plates, fingers, side wall plates and bent plates.

The plates may be connected to one end of the vessel. In use, the heat transfer fluid is supplied from a source of heat transfer fluid by one or more heat transfer fluid lines extending through the outer shell of the vessel to the passageways in the plates. Preferably, the plates are suspended from an upper part of the vessel. This arrangement is preferred because the potential impediment to solids flow is minimised. It may also be possible to connect the plates to a lower part of the vessel and this is suitable if it is desired to have the heat transfer fluid drain from the plates when a heat transfer fluid circulating pump is turned off. Use of this arrangement may be preferred if molten salts are used as the heat transfer fluid as it is advantageous to ensure that such salts are drained from the passageway in order to avoid potential freezing of the molten salts in the passageways.

Preferred embodiments of the method and the apparatus of the present invention are now described with reference to the accompanying drawings, of which:

FIG. 7 is a side elevation of another embodiment of the apparatus of the present invention for dewatering coal in accordance with another embodiment of the method of the present invention;

FIG. 9 is a side view of the discharge cone of the heating process vessel shown in FIGS. 7 and 8 with one arrangement of plates to ensure processing of coal in the discharge cone;

FIG. 10 is a similar view to FIG. 9, but with another arrangement of plates;

FIG. 11 is a cross-sectional plan view of the discharge cone shown in FIG. 9 with an arrangement of radial plates in the discharge cone to ensure processing of the coal in the discharge cone.

The present invention is a method and an apparatus for heating or cooling a charge of material in a process vessel, which method includes causing a working fluid to circulate through the process vessel.

The first embodiment of the method and the apparatus shown in FIGS. 1–6 relates to cooling a packed bed of hot, processed coal, for example, processed coal that has been treated by the method described in Koppelman U.S. Pat. No. 5,290,523.

The second embodiment shown in FIGS. 7–12 relates to heating (ie dewatering/upgrading) a packed bed of coal.

Figure 1:
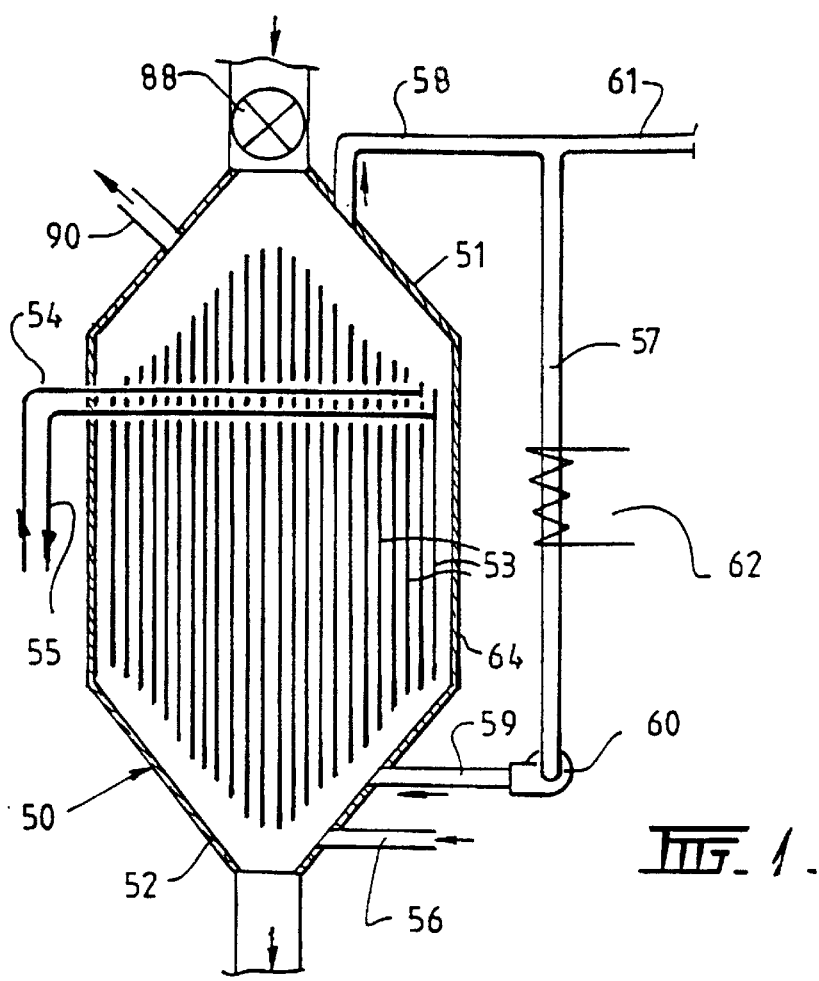
FIG. 1 shows a schematic diagram of one embodiment of the apparatus of the present invention for cooling a bed of coal in accordance with one embodiment of the method of the present invention.

With reference to FIG. 1, the first embodiment of the apparatus includes a pressure vessel 50 having an inverted conical inlet 51, a cylindrical body 64, a conical outlet 52, and an assembly of vertically disposed parallel heat transfer plates 53 positioned in the body 64 and the conical outlet 52.

The inlet 51 and the outlet 52 can be sealed to fully seal the vessel 50.

The plates 53, described in more detail hereinafter in relation to the second embodiment, include passageways (not shown) for a coolant which is circulated through the passageways via an inlet line 54 and an outlet line 55. The coolant is externally cooled by a cooling tower or refrigeration circuit (not shown) or other suitable means. Typically, the spacing of the plates 53 is between 50 and 500 mm and more typically between 75 and 125 mm.

The conical inlet 51 includes:
(i) a valve assembly 88 for allowing coal to be supplied to the vessel 50 to form a packed bed in the vessel; and
(ii) a gas outlet 90 for allowing gas to be vented from the vessel 50 if the pressure in the vessel 50 reaches a predetermined level.

The vessel further includes a nitrogen inlet line for supplying an initial nitrogen charge to the vessel 50.

The apparatus further includes a means for circulating a working fluid through the packed bed. The working fluid circulation means is in the form of a circuit for circulating nitrogen as the working fluid. The circuit includes an inlet 58 in an upper section of the vessel which enables nitrogen to be withdrawn from the vessel 50 and an outlet 59 in a lower section of the vessel 50 which enables nitrogen to be returned to the vessel. The circuit also includes a centrifugal fan 60 which forces flow of nitrogen through the vessel 50 to the inlet 58 and between the inlet 58 and the outlet 59.

The flow of nitrogen contributes to heat transfer internally in the bed from the coal particles to the plates 53.

The apparatus shown in FIG. 1 is preferably operated on a batch basis with a cycle time matching or less than the cycle time from the main process vessel used to upgrade the coal. Batch operation is preferred in order to maximise the cooling time for all the coal.

In operation, coal is supplied to the vessel 50 and forms a packed bed and the vessel is then pressurised to the required pressure with nitrogen. The centrifugal fan 60 is then used to circulate the nitrogen as the working fluid through the packed bed. Coolant supplied to the plates 53 may be circulating prior to filling the vessel 50 with coal. Alternatively, circulation of the coolant through the plates 53 may commence during filling of the vessel 50 or after the vessel 50 has been filled.

In order to demonstrate the effectiveness of the present invention the applicant developed a model to investigate the heat transfer characteristics of the above-described method with nitrogen as the working fluid. In the model, the charge of coal was assumed to have an initial temperature of 371° C. (700° F.) with plate temperatures of 25° C. (77° F.). For each of the simulations, the average bed temperature was calculated as a function of time. The target average bed temperature was assumed to be 50° C. and for each of the cases the time required to reach this target temperature was determined.

Figure 2:
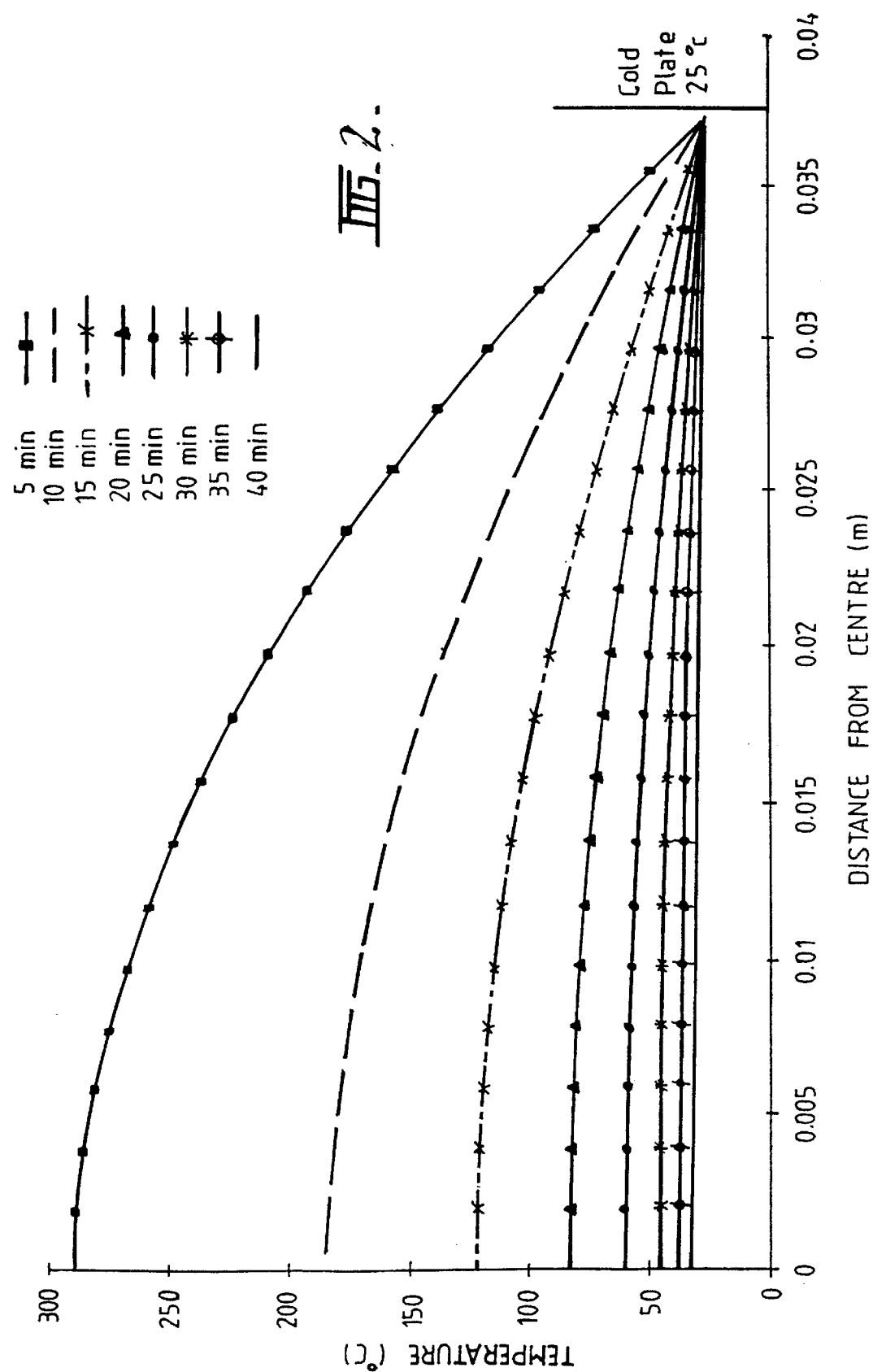
FIG. 2 is a plot of predicted temperature versus distance profiles for the cooling of a bed of coal in the apparatus shown in FIG. 1, with 75 mm plate spacings and 0.6 kg/m$^2$.s flow rate of nitrogen as the working fluid.

FIG. 2 shows the unsteady state temperature versus distance profiles generated by the model. In FIG. 2, the flow of nitrogen was set at 0.6 kg/m$^2$.s. Under these conditions, cooling occurs by conduction from the plates and convection caused by the flow of nitrogen as the working fluid through the packed bed.

From the temperature versus distance profiles shown in FIG. 2, the average temperature of the coal was calculated as a function of time. This plot is shown in FIG. 3.

Figure 3:
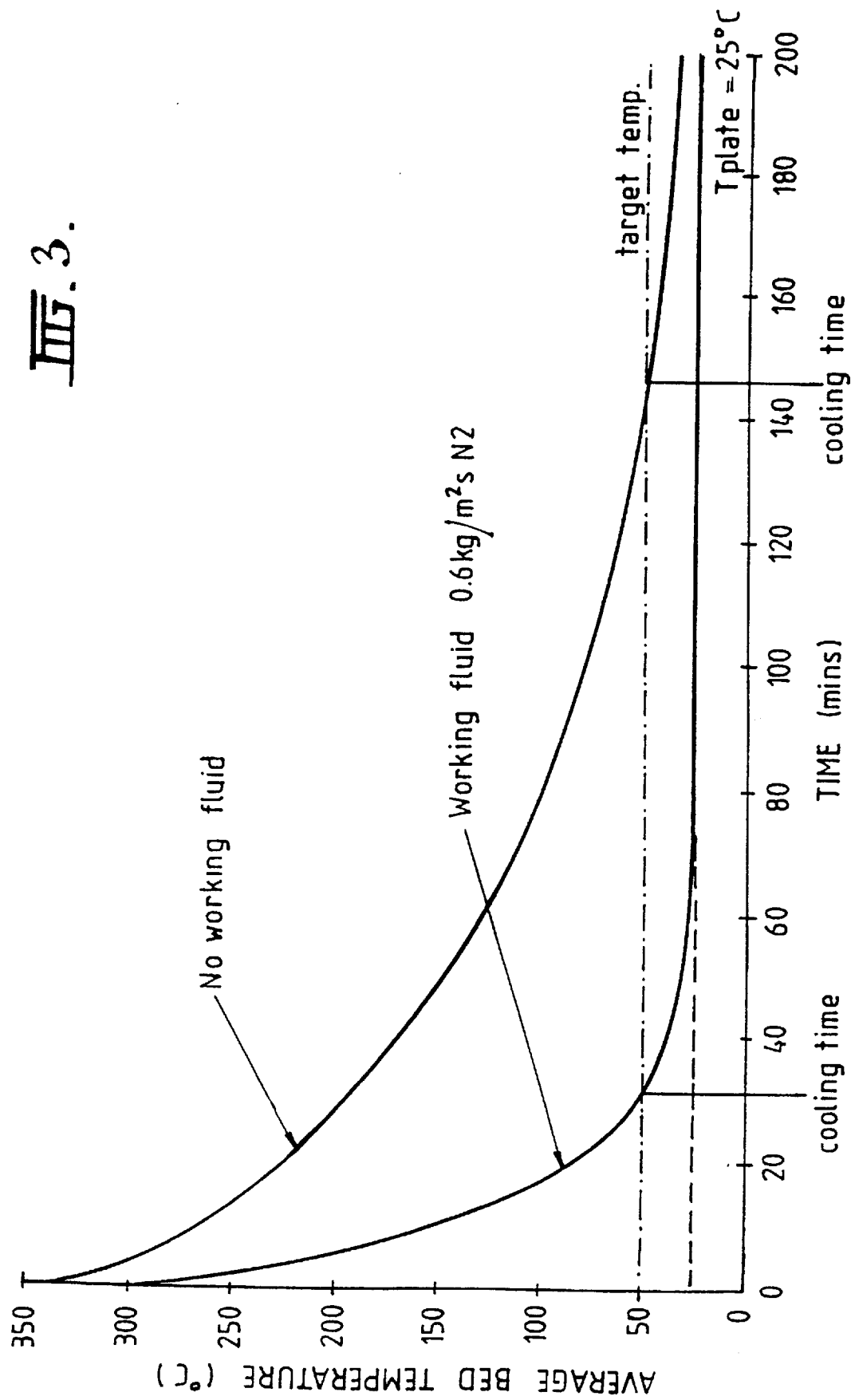
FIG. 3 is a plot of predicted average bed temperature versus time for the cooling of a bed of coal in the apparatus shown in FIG. 1 with 75 mm plate spacings with and without working fluid.
Figure 4:
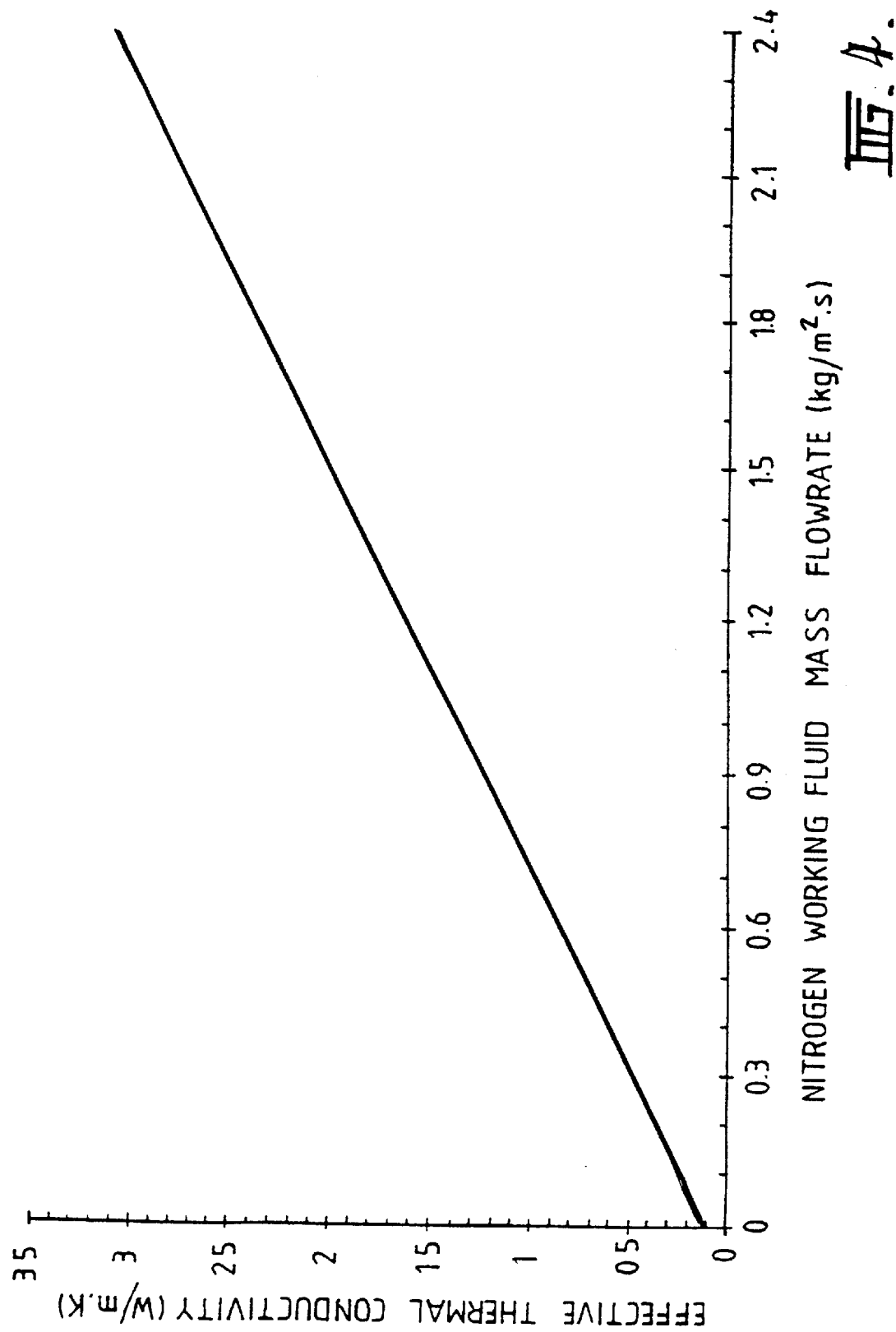
FIG. 4 is a plot of the effective bed thermal conductivity as a function of the flow rate of nitrogen as the working fluid flowrate.

FIG. 3 also shows an average temperature versus time profile for cooling using the apparatus of FIG. 1 but without circulation of a working fluid through the vessel.

It is clear from FIG. 3 that the cooling time to 50° C. is dramatically reduced (via factor of approximately 4) by using the working fluid.

The decrease in cooling time with use of the working fluid as observed in FIG. 3 may be attributed to the working fluid providing an additional convection mechanism which increases the effective thermal conductivity of the bed.

Furthermore, the applicant found that the increase in the effective thermal conductivity is proportional to the mass flow rate of the working fluid being pumped through the bed. This functionality is displayed in FIG. 4.

Figure 5:
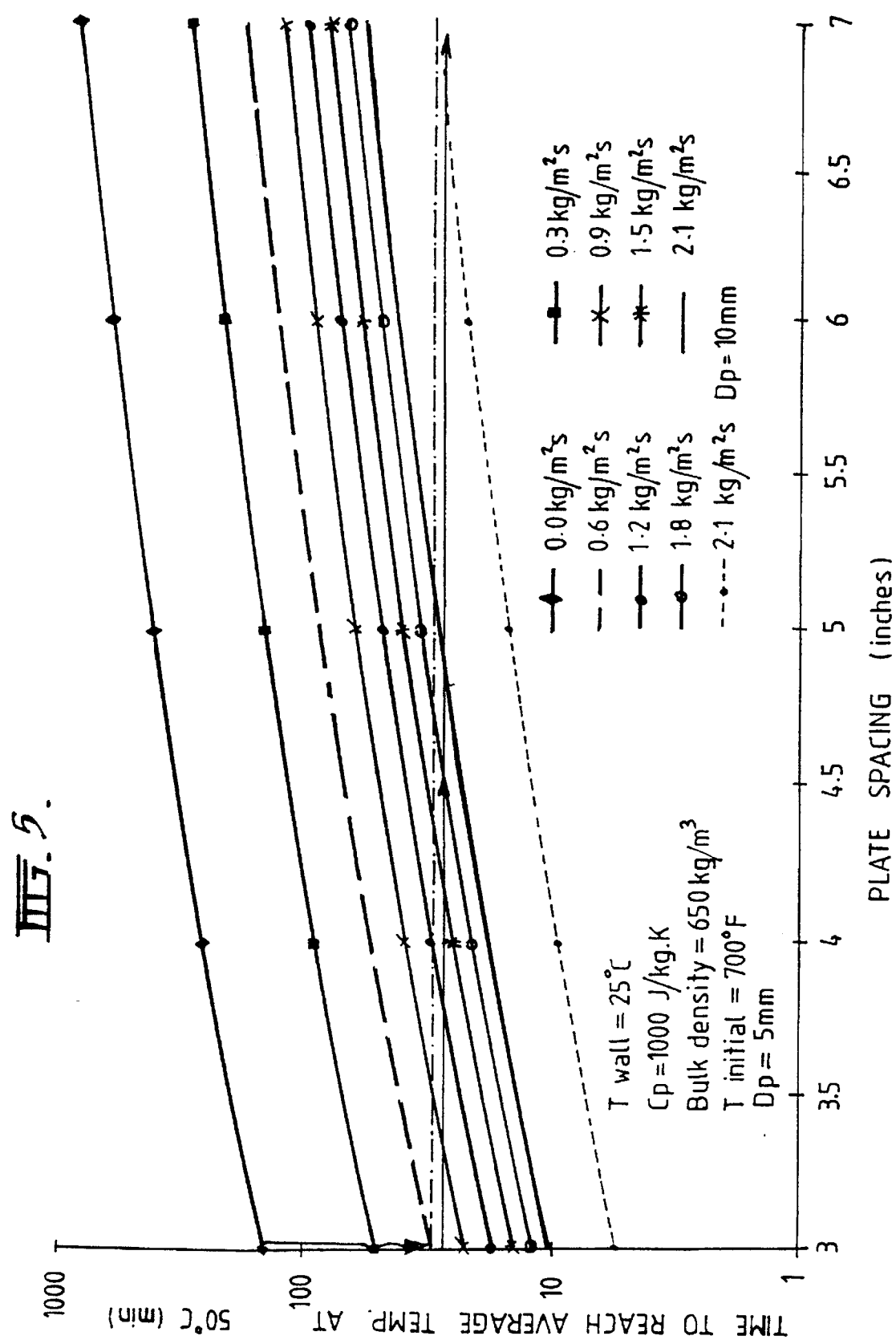
FIG. 5 is a regime diagram for cooling of a bed of coal in the apparatus shown in FIG. 1 to a target temperature of 50° C. with nitrogen as the working fluid.

The curves displayed in FIG. 3 were generated for various working fluid flowrates and plate spacings. From these curves, the time required to reach the target average temperature of 50° C. was determined. This information was been plotted in the form of a regime diagram in FIG. 5, which displays the cooling time as a function of plate spacing for various working fluid flowrates. FIG. 5 shows that increased plate spacing can be utilised but that increased flowrate of the working fluid is required to obtain satisfactory cooling times.

The flow of gas for heat transfer can be either upward or downward through the packed bed, but the preferred arrangement is for upward flow. At any gas flowrate through the bed, there is a corresponding interstitial velocity of gas within the bed. If the interstitial velocity exceeds the terminal velocity of a particle, then that particle will be entrained into the gas flow and could possibly be blown out of the coal bed. This could result in loss of solids from the bed, and therefore loss of yield of the batch. Therefore, the velocity of the gas through the bed should be controlled to minimise entrainment. One way of reducing the flowrate of a gas through the bed, whilst maintaining an acceptable mass flow rate of gas through the bed, is to increase the pressure of the system.

As the batch process proceeds, the temperature in the coal bed will obviously decrease. In order to control the mass flow rate through the bed during the batch, one option is to decrease the pressure within the system as the temperature decreases and another option is to decrease the speed of the centrifugal fan as the temperature decreases.

As shown in FIG. 1, there exists the possibility of including an optional gas chiller 62 in the working fluid circulation circuit. The inclusion of an external gas chiller 62 can be used beneficially for two reasons.

(i) If the gas is cooled prior to reintroduction to the vessel 50, and the cool gas is introduced into the cone region 63 of the vessel 50 then there may be sufficient heat capacity in the cool gas to cool much of the coal in the cone region 63. This may obviate the need for the plates 53 to extend into or be used in the cone region 63 of the vessel 50.

(ii) If the gas is chilled to a low temperature during the early stages of cooling, volatile organics may be condensed from the gas stream.

The method may be operated at atmospheric pressure or at above atmospheric pressure. If flow conditions are appropriate, it may be possible to reduce the fan size sufficiently to make the fan internal to the vessel 50. Whilst this may make maintenance more difficult, it would make the whole unit more compact.

The apparatus shown in FIG. 1 could also be configured with one or more cyclones in the nitrogen off take conduit from the cooler to ensure that any coal particles carried over from the bed are separated out from the nitrogen stream. This may allow higher gas flows through the bed as any finds that may be entrained in the gas flow could be stripped out of the gas flow.

The method has been described as a batch operation in respect of solids feed and discharge. However, the apparatus shown in FIG. 1 would also work in a continuous flow mode.

Figure 6:
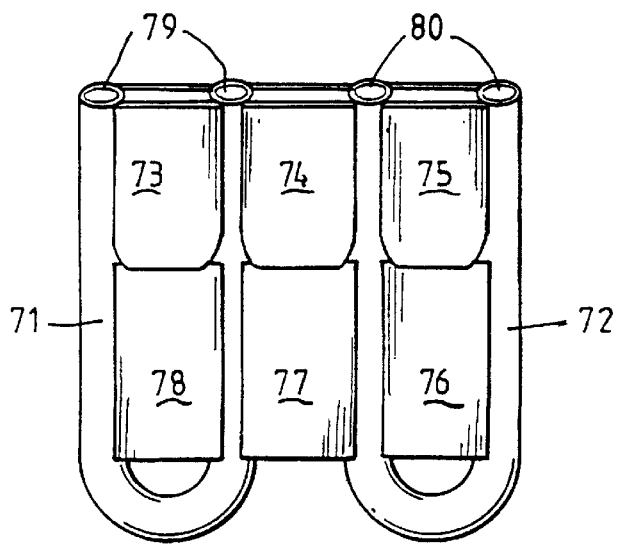
FIG. 6 is an alternative plate design for use in the apparatus of the present invention.

An alternative design for the plates in the process vessel is shown in FIG. 6. In this design, the plates comprise two boiler tubes 71, 72 having conductive bypass plates 73 to 78 welded along each side to increase the heat transfer surface to the bed. The plates may be lapped at regular intervals to lessen warping during manufacture. There may be laser cut slots along the plates. The boiler tubes 71, 72, provide passageways 79, 80, through which heat transfer fluid can flow to either heat or cool the bed. The plate design shown in FIG. 6 may be used in respect of the embodiment of the invention shown in FIGS. 1 to 6 or in the embodiment of the invention shown in FIGS. 8 to 12.

In the above described embodiment nitrogen is used as the working fluid. It will be appreciated that other components could be used as the working fluid, especially other gases, a mixture of two or more gases, or a gas or mixture or gases containing a fine mist, droplets and/or fine solids.

With reference to FIGS. 7 to 12, the second embodiment of the apparatus—which is disclosed in the context of dewatering coal—includes a process vessel 20 for heating a packed bed of coal under pressure to dewater the coal.

The vessel 20 includes an outer shell 10 and a plurality of parallel vertically disposed plates 12a to 12h located in a cylindrical region of the vessel 20.

Figure 8:
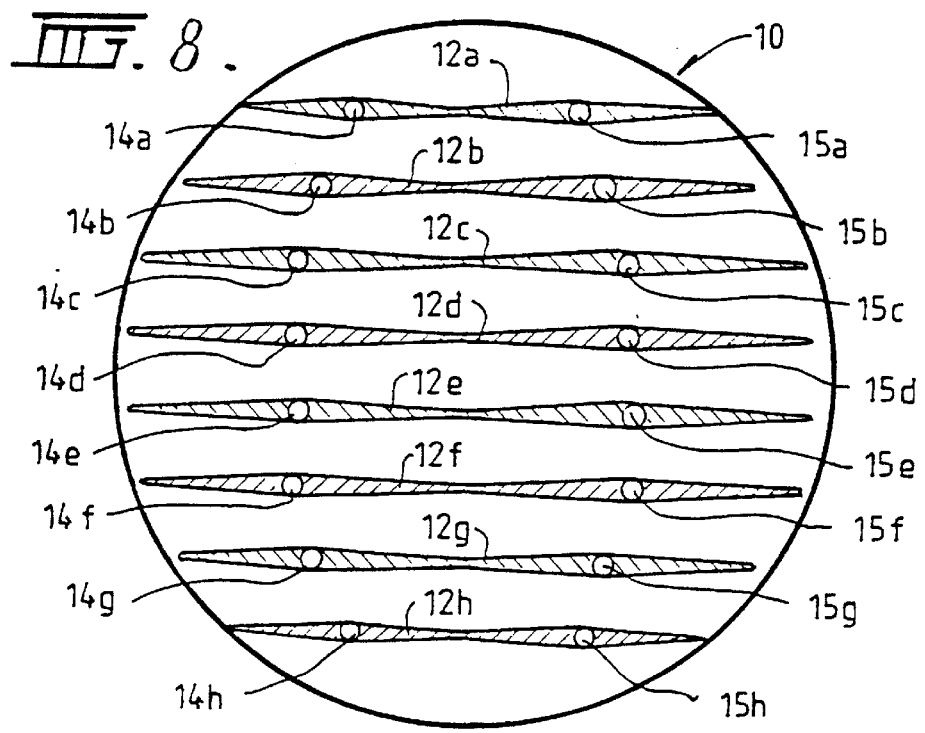
FIG. 8 is a cross-sectional view through the heating process vessel of the apparatus of FIG. 7.

Although FIG. 8 shows 8 plates in the vessel 20, it will be appreciated that a lesser or greater number of plates may be used. Each plate 12a to 12h includes two channels 14(*a–h*), 15(*a–h*), through which a heat transfer oil can flow.

The vessel 20 also includes a suspension and oil feed plate 22 positioned at a top portion thereof. The plates 12a–12h are suspended from chains attached to a series of hooks positioned around the inner periphery of the plate 22. It is noted that any suitable suspension means and supporting means may be used to suspend or support the plates in the vessel.

Plate 12a is shown in dotted outline in FIG. 7 and, as can be seen, plate 12a extends along the substantial length of vessel 20. Oil supply line 24 connected to hot oil supply (not shown) supplies oil to the plates 12a–12h via manifold arrangements (not shown). Oil return line 25 returns the oil to the oil supply means.

In one particular embodiment, vessel 20 is approximately 7 meters (23 feet) long and has a diameter of around 1 meter (3.3 feet).

The vessel 20 also includes a gas/liquid inlet 56 for introducing a pressurising fluid and/or working fluid into the vessel.

In addition, importantly, as with the first embodiment the vessel 20 includes a means for circulating a working fluid, such as nitrogen, to flow through the vessel 20. As with the first embodiment, the working fluid circulation means includes inlet 58, outlet 59 and fan 60.

In order to facilitate loading of the vessel 20 with coal, the vessel 20 includes a feed hopper 25 positioned above and offset from the top of vessel 20. Feed hopper 25 may be offset from vessel 20 to allow removal of the plates 12a–12h either singly or as assembly, for maintenance or replacement. Feed hopper 25 is connected to vessel 20 via offset conduit 26 and coal flows from feed hopper 25 through offset conduit and into vessel 20. Offset conduit 26 includes valve 26a to control the charging of coal. In use, the coal flows downwardly through the flow passages defined by the facing surfaces of adjacent plates 12a, 12b etc. and fills the vessel as a packed bed.

The vessel 20 includes a discharge cone 27 to enable discharge of coal therefrom. When the vessel 20 is filled with coal, discharge cone 27 also fills with coal. In order to process the coal that fills discharge cone 27, a number of arrangements of plates may be used within the discharge cone as is described hereinafter.

The discharge cone 27 includes a valve 27a and is connected via discharge chute 28 to a cooling drum 29. In use, after the coal has been treated, it passes through the discharge chute 28 into cooling drum 29 where the hot coal is cooled to a temperature of less than about 70° C. The cooling drum may be a process vessel of the type shown in FIG. 1. After cooling to the desired temperature, the processed coal is discharged through bottom outlet 30 via valve 30a.

Operation of the apparatus shown in FIG. 7 is now described. After filling the vessel 20 with coal, the vessel is sealed and pressurised with nitrogen and hot heat transfer oil is supplied to the channels in the plates 12a, 12b–12h. In addition, the fan 60 is operated and circulates nitrogen through the vessel 20 to the inlet 58 and from the inlet 58 to the outlet and returns the nitrogen to the vessel 20.

The hot oil is typically at a temperature of 350 to 380° C. (662–716° F.). It will be appreciated that different coal types and other solids being processed may require different optimum temperatures from those quoted above. The hot oil may be supplied to the plates before the vessel is filled with coal, during filling or after the vessel has been filled with coal.

Due to the high thermal conductivity of the plates 12a, 12b etc. the plates rapidly heat to substantially the temperature of the oil (in subsequent cycles, the plates will already be hot). Heat is then transferred from the hot plates into the coal and the circulating working fluid contributes to the heat transfer. The temperature of the coal increases and a swelling or squeeze reaction begins to occur as structural realignment of the coal forces water out of the coal. After maintaining the coal in the vessel for the desired period of time, the vessel is vented to let down the pressure from the vessel and the processed coal is discharged into the cooling drum 29, where it is cooled and subsequently discharged for sale or further processing, eg. into briquettes.

FIGS. 9 and 10 show side elevations of the discharge cone 27 of FIG. 7, with possible arrangements of plates 12a–12h (shown in dotted outline) in the cone to ensure that any coal in the cone is sufficiently heated to elevated temperature for sufficient time to be fully processed.

As shown in FIG. 9, the plates 12a–12h extend downwardly into the cone to differing extents, with the central plates extending further into the cone. The arrangement of FIG. 9 ensures that coal can freely flow through the cone whilst ensuring adequate heat transfer into the coal in the cone.

In FIG. 10, the plates 12a–12h are shaped to follow the contours of the cone. Again, some of the plates extend further into the cone than others in order to ensure that coal can freely flow through the cone.

FIG. 11 shows a plan view of the cone 27. In FIG. 11, a series of radial plates 32a to 32h are fitted permanently into the cone 27. Plates 32a to 32h may be provided with their own oil supply or they may be fed from oil line 24 shown in FIG. 2.

The plates shown in FIG. 8 have a cross section that tapers inwardly from the heating oil channels. However, other plate cross sections may be used and some alternative cross sections are shown in FIG. 12.

Figure 12A:
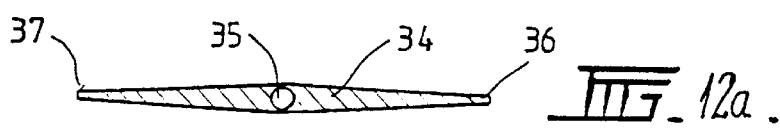
FIG. 12 shows alternative plate configurations.

FIG. 12A shows a plate having a broad central section 34 with the oil channel 35 formed in the central section and tapering to narrow ends 36, 37.

Figures 12B, 12C:

FIG. 12B shows a plate having a generally parallelpied cross section. The plate shown in FIG. 12B is a relatively small plate.

FIG. 12C shows a plate 38 having a square oil channel 39 formed in a central part thereof and tapering to points 40 and 41.

Figure 12D:

FIG. 12D shows a plate configuration generally similar to that shown in FIG. 8, with the exception that the oil channels 42, 43 are of circular cross section.

Figure 12E:
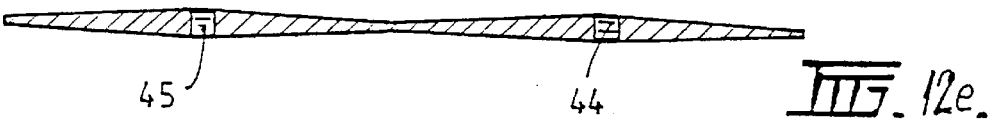
Figure 12F:
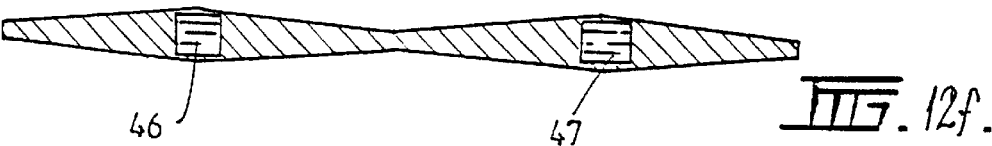

FIG. 12E shows a plate that is generally similar to that shown in FIG. 12D but with the oil channels 44, 45 including inwardly shaped projections from the plate to increase the area of heat transfer from the channel into the plate. This is more clearly shown in FIG. 12F which shows a much broader plate than shown in FIG. 12E and this plate has correspondingly larger oil channels 46, 47.

Figure 12G:
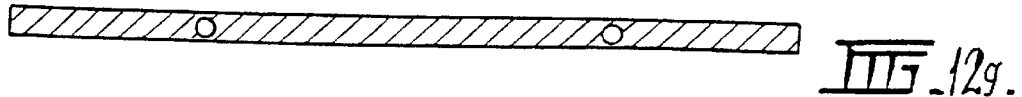

FIG. 12G shows a rectangular plate having circular cross section oil channels.

The vessel design and plate configurations shown in FIGS. 7 to 12 may be subject to a number of variations. In particular, the spacing of the plates 12a–12h may be varied in accordance with the conductivity of the material of construction for the plates, the flowability of the solids material fed to the vessel and the residence time requirements for the reaction. The thickness of the plates may also vary. It has been shown that as the thickness of the plates increases, the "thermal capacitance" of the plates increases and this acts to damp out any temperature drops that may occur during the course of particular reactions. In this regard, it is believed that thicker plates have greater thermal mass or thermal ballast and can act to buffer the enthalpy requirements of the process. The plates 12a–12h may be arranged so that they extend substantially vertically in the vessel (as shown in FIGS. 7 and 8). However, the plates may also be positioned in a horizontal or inclined orientation. The plates are preferably arranged in a vertical orientation as gravity can be used to assist in discharge of the solids from the vessel. It may also be possible to include one or more transverse extensions extending from the surface of the plates in order to improve the heat transfer into the solids material. Any such transverse extensions should be arranged so that impediment to solid flow is minimised.

The plates 12a–12h are preferably mounted loosely in the vessel and preferably are connected at one end only to the vessel. For example, as described above, the plates could be suspended on chains. Spacers may be required between the plates and the spacers preferably allow for some movement of the plates. This arrangement allows for movement of the plates if one of the flow channels between the plates becomes blocked, which movement would assist in clearing the blockage. It may also be possible to include means to move the plates, such as pushrods, hammers or vibrators.

The plates 12a–12h may be removable from the vessel, either singularly or as a whole assembly, in order to allow for maintenance of the plates or replacement of plates.

The plates 12a–12h could also include venting channels or injection channels to allow for selective venting of the solids material or selective injection of other agents into the bed of solids material.

As the pressure vessel comprising the outer shell of the vessel is completely independent of the heating devices (apart from oil pipes in and out), the vessel can be lined with an insulating material (such as a refractory lining) and also possibly a wear liner. This makes it possible for the operating temperature of the structural wall and flanges of the vessel to be kept below 100° C., which can result in considerable savings in steel used.

The outer shell of the vessel requires full pressure rating, but as it can run "cold" it may be designed without derating the allowable metal stress for temperature.

Those skilled in the art will appreciate that the invention described herein is susceptible to modifications and variations other than those specifically described. It is to be understood that the invention encompasses all such variations and modifications that fall within its spirit and scope.

What is claimed is:

1. A method of heating or cooling a charge of a solid material, which method includes the steps of: supplying the charge of the material to form a packed bed of solids in a process vessel having one or more passageways through which a heat transfer fluid can flow; passing a heat transfer fluid through the one or more passageways; supplying a working fluid to said vessel; and circulating the working fluid through said bed, the circulation step including removing at least part of the working fluid from one or more sections of the vessel and then returning the working fluid to other sections of the vessel, whereby indirect heat transfer occurs between the heat transfer fluid and the charge and between the heat transfer fluid and the working fluid, and whereby direct heat transfer occurs between said working fluid and the charge as the working fluid circulates through the bed.

2. The method defined in claim 1 further including the step of controlling the mass flow rate of the working fluid, whereby increasing the mass flow rate increases the effective thermal conductivity of the charge.

3. The method defined in claim 2 further including controlling the mass flow rate of the working fluid by controlling one or more of the velocity of the working fluid, the pressure in the vessel and the density of the working fluid.

4. The method defined in claim 1 wherein the working fluid is a gas.

5. The method defined in claim 4 further including the step of controlling the mass flow rate of the working gas, whereby increasing the mass flow rate increases the effective thermal conductivity of the charge.

6. The method defined in claim 5 further including controlling the mass flow rate of the working gas by controlling one or more of the velocity of the working gas, the pressure in the vessel and the density of the working gas.

7. The method defined in claim 4 further including the step of controlling the velocity of the working gas to be less than that at which the charge of material in the bed is fluidised.

8. The method defined in claim 1 wherein the charge of material has a low thermal conductivity.

9. An apparatus for heating or cooling a charge of a solid material, which apparatus includes:

(i) a process vessel having an outer shell that defines an internal volume for containing the charge of the material as a packed bed of solids and an indirect heat transfer means located in the internal volume for heating or cooling the charge;

(ii) a means for supplying a working fluid to the vessel; and (iii) a means for circulating a working fluid through the bed.

10. The apparatus defined in claim 9 wherein the means for circulating the working fluid through the vessel includes at least one inlet for removing the working fluid from the vessel, at least one outlet for returning the working fluid to the vessel, and a pump for causing circulation of the working fluid through the bed to the at least one inlet and from the at least one inlet to the at least one outlet.

11. The apparatus defined in claim 10 wherein the at least one inlet is in an upper section of the vessel and the at least one outlet is in a lower section of the vessel.

12. The apparatus defined in claim 9 wherein the indirect heat transfer means includes a plurality of plates of a thermally conductive material positioned within the internal volume, and each plate includes one or more passageways through which a heat transfer fluid can flow.

13. The apparatus defined in claim 12 wherein each plate in use defines at least one thermally conductive bypass between the heat transfer fluid and the material in the region of the plate such that in use substantially all of the charge is heated or cooled to a desired temperature range by heat transfer between the heat transfer fluid and the material via the plates.

14. The apparatus defined in claim 13 wherein the plates are positioned relative to each other such that in use the charge can flow in a space between adjacent plates during loading and unloading of the vessel.

15. The apparatus defined in claim 9 wherein the vessel includes an inlet means for introducing the charge into the vessel and an outlet means for removing the charge from the vessel.

16. The apparatus defined in claim 9 wherein the charge has a low thermal conductivity.

* * * * *

UNITED STATES PATENT AND TRADEMARK OFFICE
CERTIFICATE OF CORRECTION

PATENT NO.    : 6,249,989 B1
DATED         : June 26, 2001
INVENTOR(S)   : David S. Conochie et al.

It is certified that error appears in the above-identified patent and that said Letters Patent is hereby corrected as shown below:

<u>Column 6,</u>
Lines 32-34, after "in detail in" delete the rest of the sentence and insert therefor
-- commonly owned and copending U.S. Patent Application No. 09/341,406, filed September 13, 1999, and the disclosure in the copending U.S. application is hereby incorporated by reference --.

Signed and Sealed this

Fifth Day of August, 2003

JAMES E. ROGAN
*Director of the United States Patent and Trademark Office*